No. 687,871. Patented Dec. 3, 1901.
L. E. BESSETTE.
COMPOUND TOOL.
(Application filed Sept. 26, 1901.)
(No Model.)
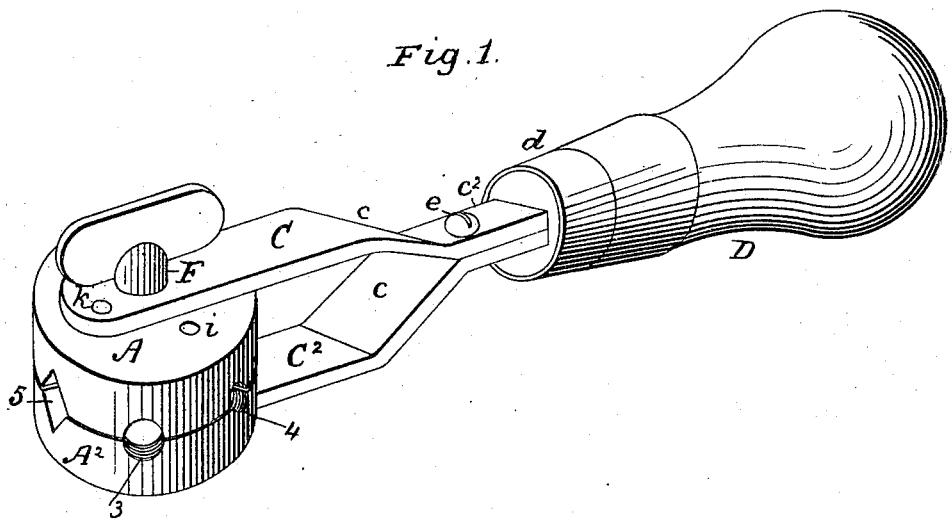
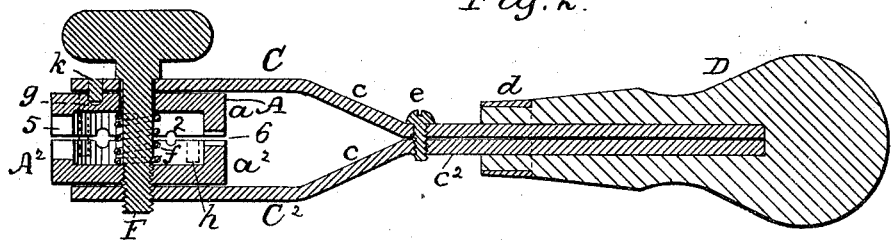
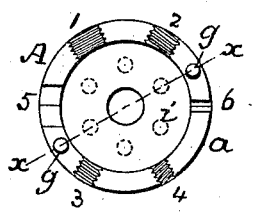
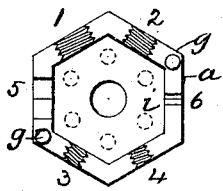
Witnesses
R. F. Storm
J. J. Masson
Inventor
Luke E. Bessette
By E. E. Masson
Attorney

UNITED STATES PATENT OFFICE.

LUKE E. BESSETTE, OF ST. CLOUD, MINNESOTA, ASSIGNOR OF ONE-HALF TO NICHOLAS GEIB, OF ST. CLOUD, MINNESOTA.

COMPOUND TOOL.

SPECIFICATION forming part of Letters Patent No. 687,871, dated December 3, 1901.

Application filed September 26, 1901. Serial No. 76,664. (No model.)

*To all whom it may concern:*

Be it known that I, LUKE E. BESSETTE, a citizen of the United States, residing at St. Cloud, in the county of Stearns and State of Minnesota, have invented certain new and useful Improvements in Compound Tools, of which the following is a specification, reference being had therein to the accompanying drawings.

This invention relates to compound tools adapted for use for various purposes; and the object of this invention is to provide a simple and inexpensive tool adapted for use as a bolt-thread repairer or sharpener, as a hand-vise, as a screw-driver-blade holder, and as a wrench. I attain this object by the construction illustrated in the accompanying drawings, in which—

Figure 1 is a perspective view of the tool constructed in accordance with my invention. Fig. 2 is a longitudinal section of the same. Fig. 3 is a side view of the inner face of one of the two clamping-dies of the tool. Fig. 4 is a transverse section of said die on the line $x\ x$ of Fig. 3. Fig. 5 is a side view of a die slightly modified in form from Fig. 3.

In said drawings, A and $A^2$ represent the two cup-shaped dies of the device. Said dies are preferably cylindrical. Their outer faces are flat, but their inner faces are concave. Around the concavity of said faces there are rims $a$ and $a^2$, arranged to face each other. The face of each rim is flat, and within said faces a series of radial depressions is made. The depressions 1, 2, 3, and 4 are in the form of half-cylinder crescents that are screw-tapped with taps of different diameters. There are also angular depressions 5 and 6 to receive the stems of tools or other articles. For example, the opening 5, which is relatively large, is well adapted to receive the tine of a large screw-driver or small nuts and the tool be used as a wrench. The smaller opening 6 is adapted to receive smaller tools or to clamp a piece of wire.

The dies A and $A^2$ are placed between a pair of flat and slightly-springy branches or plates C and $C^2$, which have their rear ends bent toward each other at $c$ and lying in close contact at $c^2$. The part $c^2$ of each branch is reduced in width and somewhat pointed to constitute tines which are driven into the handle D, said handle being provided with a ferrule $d$ to reinforce it. The outer portions of the tines $c^2$ are also united together with a small screw $e$, passing transversely through them. The dies are revolubly united to the branches C and $C^2$ by means of a bolt F, having its screw-threaded end in engagement with the branch $C^2$ and its head resting upon the branch C. Said head is flattened to be easily grasped and rotated. To spread apart the outer ends of the branches C and $C^2$ and also the dies A and $A^2$ to facilitate the introduction of objects between the latter, a coiled spring $f$ encircles the bolt F and its ends bear against the inner faces of the dies. Said dies are either cylindrical, as shown in four of the figures, or polygonal, as shown in Fig. 5.

To cause the two dies A and $A^2$ to be rotated together, one of them has projecting from its rim two pins $g$, that are received loosely into similarly-located perforations $h$ made in the rim of the other die, so that the two dies constitute substantially a single body. To retain said dies so that either one of the pairs of perforations is in the axis of the handle, the die A has in its flat top a series of cup-like depressions or holes $i$ to receive into either one of them a short pin $k$, projecting from the under side of the flat branch C of the device.

Having now fully described my invention, I claim—

1. A compound tool consisting of a handle, two flat branches projecting therefrom, two cup-like dies having their rims facing each other, and depressions of various forms and sizes in said rims, pins projecting from the rim of one die and entering the rim of the other, a screw-bolt passing through the flat branches and through the dies, a spring coiled around said bolt, and a pin passing through one of the branches and in engagement with one of the dies, substantially as described.

2. In a compound tool, the combination of a handle, two flat branches projecting therefrom, two cup-like dies having their rims facing each other, and depressions of various forms and sizes in said rims, pins projecting from the rim of one die and entering the rim of the other, a screw-bolt passing through the flat branches and through the dies, and a pin passing through one of the branches and in engagement with one of the dies, substantially as described.

In testimony whereof I affix my signature in presence of two witnesses.

LUKE E. BESSETTE.

Witnesses:
ANDREW C. ROBERTSON,
W. S. ROBERTSON.